May 27, 1930. J. H. SLAKER 1,760,016
EARTH SCRAPER
Filed Dec. 24, 1926 3 Sheets-Sheet 3
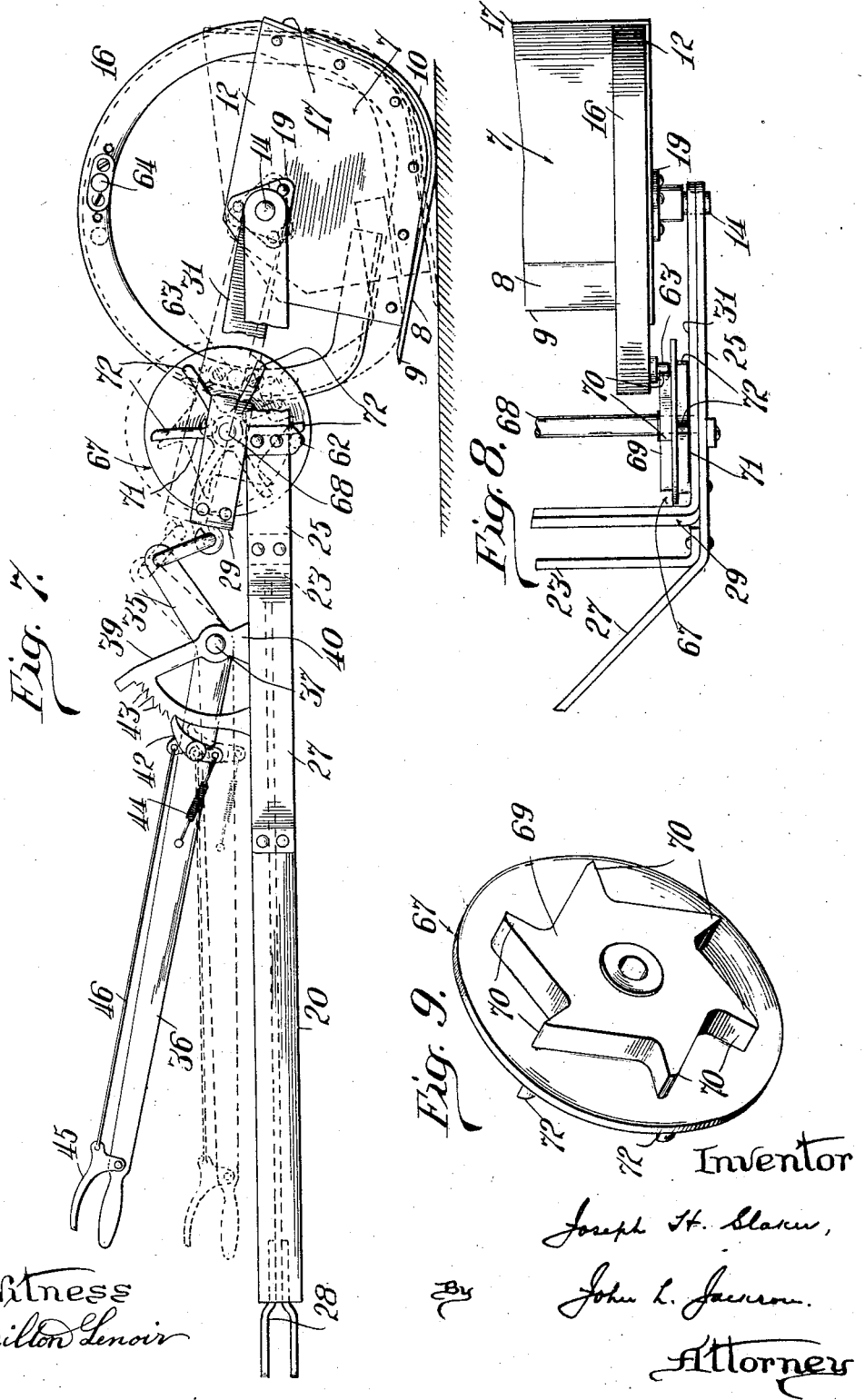

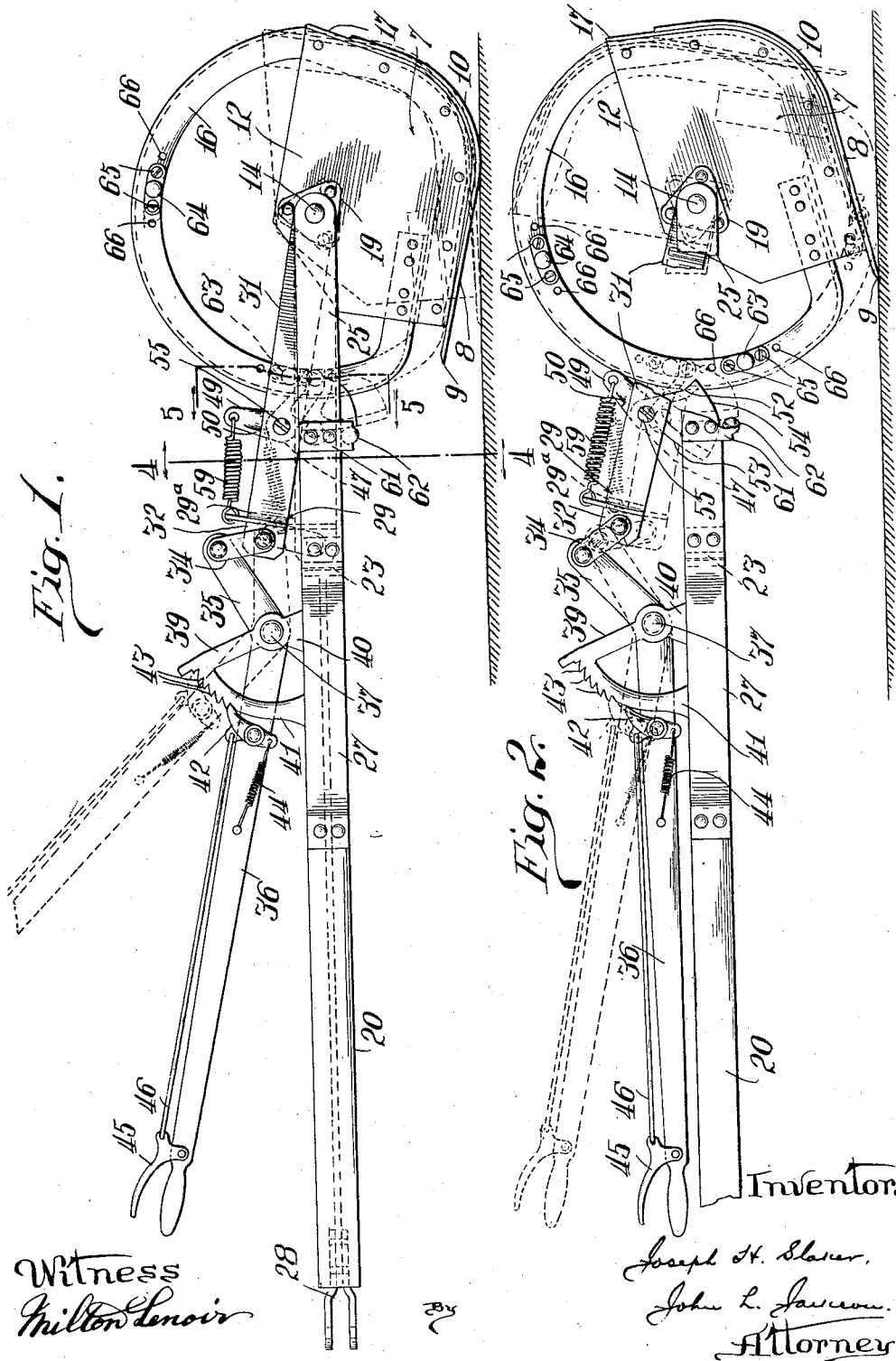

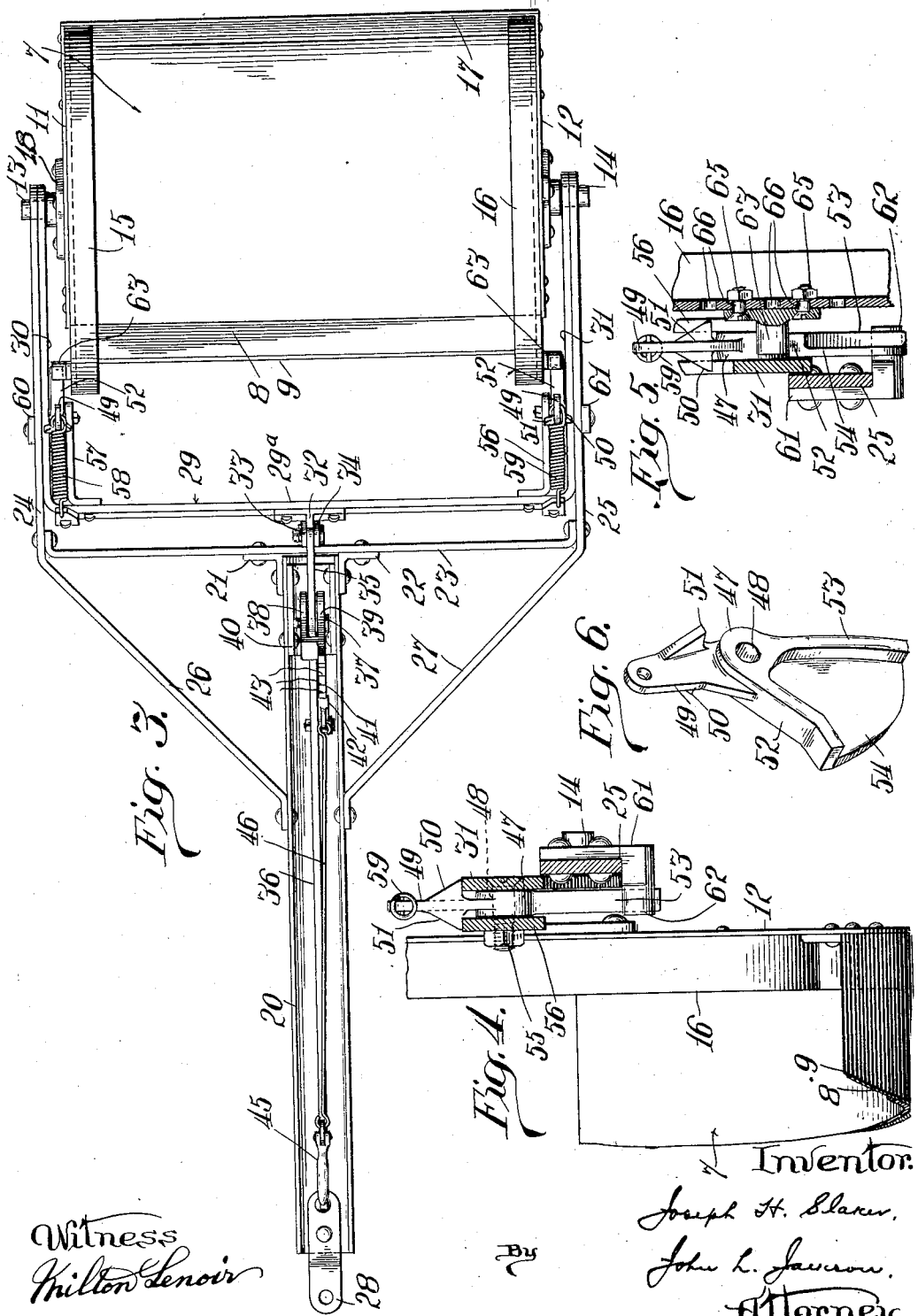

Patented May 27, 1930

1,760,016

UNITED STATES PATENT OFFICE

JOSEPH H. SLAKER, OF AURORA, ILLINOIS, ASSIGNOR TO WESTERN WHEELED SCRAPER COMPANY, OF AURORA, ILLINOIS, A CORPORATION OF ILLINOIS

EARTH SCRAPER

Application filed December 24, 1926. Serial No. 156,783.

My invention relates to earth scrapers of the so-called "Fresno" type, comprising a scoop or pan having a scraping front edge, the pan being provided at its sides with upwardly extending arcuate members adapted to roll on the ground when the pan is being dumped, and support it in its load distributing position, and also as it rolls completely over about a transverse axis and returns to its transport position. In the latter position the pan is arranged to ride on the rounded rear portion of its bottom with its front or scraping edge elevated sufficiently to clear the ground, so that it may be hauled to the place of loading without taking up earth, and without spilling its load. Scrapers of this type are frequently arranged to be hauled by a team, but in many instances they are designed to be drawn by a tractor, and in the latter case it is preferable to so mount the controlling devices by which the position of the pan is regulated so that they may be easily operated by the operator of the tractor or an attendant riding thereon.

The object of my present invention is to provide a scraper of this type equipped with improved means for controlling its operation, by which the several operations of shifting the pan from transport to loading position, and causing it to be dumped may all be conveniently performed by an operator on the tractor; also to provide for adjusting the controlling devices so that the operation of the scraper may be accurately regulated. It should be understood, however, that while my invention is intended primarily for tractor drawn scrapers, the improvements hereinafter described may also be applied to horse drawn scrapers, and the claims should be construed accordingly. I accomplish my objects as illustrated in the drawings and hereinafter described. What I regard as new is set forth in the claims.

In the accompanying drawings which illustrate the preferred embodiment of my invention,—

Fig. 1 is a side elevation showing in full lines the pan and the controlling devices in the position they occupy when the scraper is arranged for transport. The loading position of such parts is shown in dotted lines in said figure.

Fig. 2 is a side elevation showing in full lines the arrangement of the parts at the early part of the dumping operation. In said figure the pan is shown in dotted lines in its distributing position, and the normal or transport position of the controlling devices is also shown in dotted lines.

Fig. 3 is a plan view.

Fig. 4 is an enlarged detail, being a partial vertical cross-section on line 4—4 of Fig. 1.

Fig. 5 is a partial vertical cross-section on line 5—5 of Fig. 1.

Fig. 6 is a perspective view of the latch by which the pan is held in its transport and loading position, and by the release of which dumping is permitted.

Fig. 7 is a partial side elevation showing a modification.

Fig. 8 is a partial plan view thereof; and

Fig. 9 is a perspective view of the modified latch mechanism.

Referring to the drawings,—7 indicates the scraper pan as an entirety, which comprises a bottom plate 8 having a sharpened front edge 9 and a rounded rear portion 10, side plates 11, 12 and trunnions 13, 14 secured to the outer faces of such side plates and projecting outwardly therefrom to form journals about which the pan may rotate. Secured to such side plates are arcuate members 15, 16, which extend upward beyond the upper margins of the side plates and also extend forward beyond the cutting edge 9, as best shown in Figs. 1 and 2. These arcuate members are best made of curved angle iron pieces secured to the side plates in any suitable way, and if desired they may also be secured to the bottom 8, or they may be provided by extending the side plates upwardly and rounding their upper margins. As best shown in Figs. 1 and 2, the bottom is reenforced by a curved plate 17 that is secured thereto and preferably extends up beyond the upper margin of the curved portion 10 of the bottom, so that it serves as a rear wall for the pan. The trunnions 13, 14 may be secured to the side plates in any suitable way, but preferably they are provided with plates 18, 19 at their inner ends which are riveted to the outer surfaces of the side plates, as shown in Fig. 3. The construction described is that which I prefer to use, but the precise way in which the parts mentioned are fashioned may be modified to suit the ideas of the manufacturer without departing from the general type of scraper with which my invention has more particularly to do.

The scraper pan is provided with draft connections of such construction as to permit of its rotation about a transverse axis when occasion requires, and in the scraper illustrated such draft connections comprise a centrally disposed tongue 20 in the form of an I-beam arranged with its central web disposed horizontally. The rear end of the tongue 20 is connected by angle brackets 21, 22 with a cross-bar 23, the end portions of which are secured to side bars 24, 25 at opposite sides of the pan. The rear ends of such side bars are pivotally connected with the trunnions 13, 14, respectively, and their forward portions converge, as shown at 26, 27, and are connected with the intermediate portion of the tongue 20, as best shown in Fig. 3. I thus provide a draft frame bifurcated at its rear end, between the rearwardly extending arms or side members 24, 25 of which the scraper pan is pivotally mounted. At its front end the tongue 20 is provided with a clevis 28 or other suitable connection for attaching it to a tractor, but if desired means may be provided for hitching a team to the draft frame.

The means for controlling the position of the pan comprise a number of elements which will now be described. As best shown in Fig. 3, a U-shaped frame or bail 29 is provided, the intermediate portion 29ᵃ of which extends transversely of the scraper in advance of the pan and adjacent to and parallel with the cross-bar 23, while the end portions 30, 31 of said bail lie parallel with the side bars 24, 25 of the draft frame and are pivotally connected with the trunnions 13, 14 between the side members 24, 25 and the side walls of the pan. By this arrangement the bail 29 is adapted to swing vertically concentrically with the axis of the pan between the side members 24, 25 of the draft frame, turning about the trunnions 13, 14.

Secured to and extending forward from the central portion of the member 29ᵃ of the bail 29 is a rigid arm 32, which is connected by links 33, 34 with the rearwardly projecting arm 35 of a control lever 36 fulcrumed on a transverse pivot bolt 37 mounted on the draft frame. In the construction illustrated the pivot 37 is mounted on two parallel arms 38, 39 of a bracket 40 secured to the tongue 20 as shown in Fig. 3. Said bracket also has an arm 41 in the form of a ratchet toothed sector that at its upper end is connected with the joined upper ends of the arms 38, 39, preferably being formed integral therewith, and at its lower end is secured to the tongue in any suitable way. The lever 36 extends between the arms 38, 39 of the bracket 40 and is fulcrumed on the pivot bolt 37, so that it has a stable support. Said lever is provided with a dog 42 that is adapted to engage the teeth 43 of the sector 41 to lock the lever against upward movement. A spring 44 tends to hold the dog 42 in engagement with said ratchet teeth, and a hand lever 45 connected with the dog by a rod 46 provides means for unlocking the lever 36 to permit it to be swung upward. Said lever is, however, free at all times to swing downward. As will be apparent, by swinging the lever 36 vertically about its pivot 37 the bail 29 may be swung vertically about a center coaxial with the trunnions 13, 14, through the connection of the arm 32 at the front of the bail with the arm 35 of said lever through the links 33, 34. This swinging movement of the bail is employed to control the position of the pan through instrumentalities that will now be described.

Mounted on the bail 29 adjacent to its side members 30, 31 are two members that may be conveniently termed latches, since their function is to hold the pan either in transport or in loading position, and to release it to permit it to be dumped, these several functions being performed under regulation of the control lever 36. The construction of these latches, which are alike, except that they are preferably made as rights and lefts, is best shown in Fig. 6. As there shown, each latch comprises a hub portion 47 having a pivot bearing 48, an upwardly extending arm 49 provided at its opposite margins with laterally extending lugs 50, 51, best shown in Fig. 5, and front and rear downwardly diverging arms 52, 53 preferably connected by a web 54 to give added strength. The bracket therefore is in effect a three-armed lever having an upwardly extending arm and two downwardly diverging arms. One of these brackets is mounted adjacent to the side member 31 of the bail, being supported on a pivot bolt 55 that is mounted in said side member and extends through the bearing 48 of the latch and through a re-enforcing support in the form of a bar 56 secured to the transverse member 29ᵃ of the bail adjacent to and in parallelism with the side member 31. The latch at the opposite side of the scraper is similarly mounted between the side member 30 of the bail and a re-enforcing bar 57, as shown in Fig. 3. By this construction the latches are held at a constant distance from the axis of the pan, and swing vertically toward or from the draft frame concentrically with such axis. The lugs 50, 51 of the latches overlie the upper margins of the members 31, 56 or 30, 57 as the case may be, and serve to limit the rocking movement of the latches about their respective pivots. The latches are mounted on the bail with their arms 52 extending downwardly and rearwardly, and their arms 49, 53, which are approximately alined, in a more or less nearly vertical position, and they are provided with springs 58, 59 that tend to hold them in a substantially vertical position, as illustrated in Fig. 1. At that time the lugs 50, 51 bear on the upper surfaces of the members of the bail between which the latches are mounted, but as said lugs are offset forwardly to some extent with respect to the pivot bearing 48 they do not prevent swinging of the latches in a clockwise direction as viewed in Fig. 1. When this occurs the lugs 50, 51 are carried up out of engagement with the bail, as illustrated in Fig. 2.

At each side of the bail and secured to the side members thereof are downwardly extending brackets 60, 61 in the form of bars that are provided at their lower ends with inwardly projecting stops 62 that extend into the path of the latches 47, and by their engagement with the front faces of the downwardly projecting arms 53 thereof prevent the latches from swinging in a clockwise direction as viewed in Figs. 1 and 2. The arms 53, may, however, be carried up high enough so that their lower ends clear the stops 62, when such rocking of the latches will be permitted. Upward movement of the latches for this purpose is effected by swinging the bail upward. Fig. 1 shows the bail in what will be termed its normal position, since it occupies that position when the pan is adjusted for transporting the load. When the bail is in this position the lower end of the arms 53 of the latches bear against the stops 62 which are then near such lower ends. The bail may, however, be swung downward to the dotted line position shown in Fig. 1, thereby moving the arms 53 down further, but they will still remain in engagement with said stops, and be held thereby against rocking in a clockwise direction. Again, the bail may be swung upward from the position shown in Fig. 1 to the full line position shown in Fig. 2, so as to carry the lower ends of the arms 53 up above the stops 62, in which event the latches will be released and permitted to rock in a clockwise direction. These three positions of the latches correspond respectively with the transport, the loading, and the dumping positions of the pan, and by appropriately moving said latches the operation of the pan is controlled. When the parts are in transport or loading position the arms 52 of the latches extend rearwardly beyond the side margins of the arcuate members 15, 16, and lie adjacent to their outer faces, as best shown in Figs. 3, 4 and 5, and projecting outwardly from the outer face of each arcuate member are two stops 63, 64 set approximately ninety degrees apart. Said stops, however, are adjustable relatively to each other so that the operation of the scraper may be accurately adjusted. Preferably said stops are secured to the arcuate members by means of screws 65 engaging holes 66, a plurality of which are provided, so that the stops may be shifted to a greater or less extent. These stops are so positioned as to be capable of being intercepted by the arms 52 of the latches when the latches are in their normal position, as best shown in Figs. 3 and 4, but when the latches are released the arms 52 may swing down out of engagement with said stops to permit rotation of the pan. The stops 63 are provided for the purpose of cooperating with the latches to hold the pan in its transport or loading positions, and the stops 64 cooperate with said latches to hold the pan in its load distributing position, which is indicated by dotted lines in Fig. 2.

The operation of my improved scraper is as follows: Assuming the parts to be in the position shown in full lines in Fig. 1, the control lever 36 will be locked against upward movement by the dog 42, and consequently will hold the front end of the bail 29 up in the position shown. At this time the rearwardly extending arms 52 of the latches will underlie the stops 63 and the downwardly extending arms 53 of said latches will bear forwardly against the stops 62, so that the latches cannot swing clockwise. The scraper pan will, therefore, be held against rotation in a counterclockwise direction by the engagement of the stops 63 with the arms 52, and by reason of the position of the bail and the disposition of the parts mentioned, the front or cutting edge 9 of the pan will be tilted upward out of operative position, and the pan will ride on the rounded portion of its bottom. When the pan is to be loaded the control lever 36 is swung upward to the dotted line position shown in Fig. 1, thereby lowering the bail and the latches to the dotted line position shown in said figure. This carries the latch arms 52 downward and permits the pan to rock counterclockwise far enough to bring its cutting edge into operative position. At this time the latches will still be held against rocking in a counterclockwise direction by reason of the engagement of their arms 53 with the stops 62. After the pan has been loaded, the lever 36 is moved downward to position shown in full lines in Fig. 1 to return the pan to its transport position.

When the dumping place is reached the control lever 36 is moved downward to the position shown in full lines in Fig. 2, which carries the front end of the bail upward, thereby raising the latches until the lower ends of their arms 53 rise above the stops 62, so that the latches are no longer held against clockwise rotation. Consequently their arms 52 are then free to swing downward, and thereupon the pan rotates in a counterclockwise direction, its rotation being started by its friction with the ground, and continued by the engagement of its cutting edge with the ground. As soon as the pan begins to dump the operator returns the control lever 36 to its transport or normal position, thereby again locking the latches against clockwise rotation, and, therefore, as soon as the stops 64 reach the arms 52 the rotative movement of the pan will be stopped, leaving it in its load distributing position, as indicated by dotted lines in Fig. 2. After the load has been distributed the operator again depresses the lever 36 to free the latches from the stops 62, whereupon the pan continues its rotation until it returns to its transport position. In the meantime the operator restores the lever 36 to its normal position, thereby locking the latches with their arms 52 in position to intercept the stops 63 so that when the pan reaches the latter position it is arrested. The springs 59 tend to rotate the latches in a counterclockwise direction to bring them into position to engage the stops 62 when the bail is lowered, but the lugs 50, 51 limit the extent to which the latches may rock under the action of said springs.

In Figs. 7, 8 and 9 I have shown a scraper equipped with a modified form of latch mechanism which avoids the use of the spring 59 for normally holding the latches in their operative position. The construction shown in said figures is in other respects the same as that shown in the preceding figures, except that instead of using latches in the form of three-armed levers and providing the stops 50, 51, the latches are made in the form of wheels 67 rotatably mounted on the bail 29 adjacent to the side members 30, 31 thereof. This is best accomplished by mounting a shaft 68 between said side members and fitting the wheels 67 upon the end portions thereof so as to rotate therewith, the shaft itself being journaled in the side members of the bail, so that it is held at a constant distance from the axis of the pan.

The construction of the wheels 67 is best shown in Figs. 7 and 9, from which it will be seen that each latch comprises a ratchet wheel 69 having teeth 70, and a star wheel 71 having radiating spokes or arms 72, best shown in Fig. 7, these two wheels being arranged co-axially and preferably separated by an intermediate disc 73. These parts are best made integral, as best shown in Fig. 9. The shaft 68 is so located and the ratchet teeth 70 so proportioned that said teeth successively move into position to intercept one or the other of the stops 63, 64 as the wheel rotates, and, therefore, by holding the wheel against rotation the scraper may also be held against rotation in the same way as is accomplished by the three-armed latches hereinbefore described. The latch wheels are normally held against rotation by the stops 62, since one or another of the arms 72 of said latch wheels is adapted to engage said stops when the bail 29 is in the position it occupies when the pan is in transport, loading or load distributing position, in the same way that the arms 53 of the previously described latch mechanism cooperate with said stops to prevent rotation of the pan. By moving the bail 29 upward far enough the latch wheels may be raised so that the outer ends of their arms 72 clear the stops 62, thereby releasing said wheels and permitting them to rotate freely, and consequently allowing the scraper pan to rotate. It will be observed that the several teeth of the ratchet wheels 69 move successively into position to intercept one or the other of the stops 63, 64 as the wheel 67 rotates, and that in like manner the several arms 72 of the latch wheels move successively into position to be brought into engagement with the stops 62 by downward movement of the bail. The latch wheels are, of course, caused to rotate to a limited extent by the rotation of the pan either in moving from its transport to its load distributing position, or by its subsequent rotation by which it is returned to its transport position, and a sufficient number of teeth 70 and arms 72 are provided so that one of the arms is always in position to intercept the stops carried by the arcuate members. It is therefore unnecessary to provide means such as a spring for rotating the latch wheels 67 in a reverse direction to restore the teeth 70 and arms 72 to operative position.

In the drawings I have shown the scraper as being provided with two latches, as that construction is desirable, but it should be understood that a single latch may be used within the scope of my invention. In other respects also my invention is not limited to the specific construction shown and described, except in so far as claims may be directed partciularly thereto, but includes generically the subject-matter of the broader claims. So far as I am aware it is broadly new to provide a scraper of the type described with latch mechanism movable by the operation of a control lever, to lock or release the pan.

What I claim as my invention and desire to secure by Letters Patent, is—

1. An earth scraper of the type described comprising a draft frame, a pan pivotally connected therewith and having upwardly extending arcuate means secured thereto to rotate therewith, a lever fulcrumed on the draft frame, and latch mechanism for holding the pan against rotation, said latch mechanism being movable by said lever concentrically with the axis of the pan to release the pan to permit it to rotate.

2. An earth scraper of the type described comprising a draft frame, a pan pivotally connected therewith and having upwardly extending arcuate means secured thereto to rotate therewith, a control lever, and latch mechanism for holding the pan against rotation, said latch mechanism being movable by said lever relatively to the draft frame concentrically with the axis of the pan into either holding or releasing position.

3. An earth scraper of the type described comprising a draft frame, a pan pivotally connected therewith and having arcuate rolling members secured thereto to rotate therewith, a lever fulcrumed on the draft frame, a vertically swinging support mounted concentrically with the axis of the pan and movable by the operation of said lever, and latch mechanism mounted on said support and movable therewith to hold the pan in its transport and loading positions, and to release the pan to permit it to rotate, all under the actuation of said lever.

4. An earth scraper of the type described comprising a draft frame, a pan pivotally connected therewith and having upwardly extending arcuate members secured thereto to rotate therewith, a lever fulcrumed on the draft frame, a vertically swinging support mounted independently of said lever and movable relatively to the draft frame by the operation of said lever, latch mechanism pivotally mounted on said support and movable therewith toward and from the draft frame, a stop carried by the draft frame, said latch mechanism being movable into or out of operative relation with said stop by movement of said support, and means carried by the pan and cooperating with said latch mechanism to hold the pan against rotation.

5. An earth scraper of the type described comprising a draft frame, a pan pivotally connected therewith and having upwardly extending arcuate members secured thereto to rotate therewith, a lever fulcrumed on the draft frame, a vertically swinging support pivoted concentrically with the axis of the pan and movable toward and from the draft frame by the operation of said lever, latch mechanism pivotally mounted on said support and movable therewith toward and from the draft frame, a stop carried by the draft frame, said latch mechanism being movable into or out of operative relation with said stop by movement of said support, and means carried by the pan and cooperating with said latch mechanism to hold the pan either in transport or in its load distributing position.

6. An earth scraper of the type described comprising a draft frame, a pan pivotally connected therewith and having upwardly extending arcuate members secured thereto to rotate therewith, a lever fulcrumed on the draft frame, a bail pivotally mounted concentrically with the axis of the pan and operatively connected with said lever, latch mechanism carried by said bail and movable therewith toward and from the draft frame, means carried by the draft frame adapted to hold said latch mechanism in operative position, and to release the same by movement of the bail away from the draft frame, and means carried by the pan and cooperating with said latch mechanism to hold the pan against rotation.

7. An earth scraper of the type described comprising a draft frame, a pan pivotally connected therewith and having upwardly extending arcuate members secured thereto to rotate therewith, a lever fulcrumed on the draft frame, a vertically swinging support pivoted concentrically with the axis of the pan, a link connecting said support with said lever, latch mechanism carried by said support and movable therewith toward and from the draft frame, means carried by the draft frame adapated to hold said latch mechanism in operative position when the pan is in transport or in loading position, and to release said latch mechanism by movement of said support to a predetermined extent away from said draft frame, and means carried by the pan and cooperating with said latch mechanism to hold the pan against rotation.

8. An earth scraper of the type described comprising a draft frame, a pan pivotally connected therewith and having upwardly extending arcuate members secured thereto to rotate therewith, a lever fulcrumed on the draft frame, a vertically swinging support pivotally connected with the axis of the pan, a link connecting said support with said lever, latch mechanism pivotally mounted on said support, said latch mechanism having downwardly and rearwardly extending arms, a stop carried by the draft frame adapted to engage said downwardly extending arm by movement of said support toward the draft frame, to hold said latch mechanism in operative position, and to release said latch mechanism by movement of said support to a predetermined extent away from the draft frame, and means carried by the pan cooperating with said rearwardly extending arm to hold the pan against rotation when said latch mechanism is held in operative position.

9. An earth scraper of the type described comprising a draft frame, a pan pivotally connected therewith and having upwardly extending arcuate members secured thereto to rotate therewith, a lever fulcrumed on the draft frame, a bail pivotally mounted concentrically with the axis of the pan and operatively connected with said lever, latch mechanism pivotally mounted on the bail, said latch mechanism having downwardly and rearwardly extending arms, a stop carried by the draft frame adapted to engage said downwardly extending arm by movement of the bail toward the draft frame, to hold said latch mechanism in operative position, and to release said latch mechanism by movement of the bail to a predetermined extent away from the draft frame, and stops carried by one of said arcuate members and adapted to engage said rearwardly extending arm to hold the pan against rotation when said latch mechanism is in operative position.

10. An earth scraper of the type described comprising a draft frame, a pan pivotally connected therewith and having upwardly extending arcuate members secured thereto to rotate therewith, a lever fulcrumed on the draft frame, a bail pivotally mounted independently of the lever to swing vertically toward and from the draft frame, a link pivotally connecting said bail with said lever, latch mechanism pivotally mounted on the bail, a stop carried by the draft frame adapted to engage said latch mechanism by movement of the bail toward the draft frame, to hold said latch mechanism against rotation, and to release said latch mechanism to permit rotation thereof, by movement of the bail to a predetermined extent away from the draft frame, and stops carried by one of said arcuate members and adapted to engage said latch mechanism to hold the pan against rotation when said latch mechanism is in operative position.

11. An earth scraper of the type described comprising a draft frame, a pan pivotally connected therewith and having upwardly extending arcuate members secured thereto to rotate therewith, a lever fulcrumed on the draft frame, a bail pivoted concentrically with the axis of the pan to swing toward and from the draft frame and connected with said lever to be actuated thereby, a latch pivoted on said bail and having downwardly and rearwardly extending arms, a stop carried by the draft frame in advance of said downwardly extending arm and adapted to be engaged thereby to hold the latch in operative position, a spring tending to move said downwardly extending arm away from said stop, and stops carried by one of said arcuate members and adapted alternatively to engage said rearwardly extending arm to hold the pan against rotation.

12. An earth scraper of the type described comprising a draft frame, a pan pivotally connected therewith and having upwardly extending arcuate members secured thereto to rotate therewith, a lever fulcrumed on the draft frame, a bail pivoted concentrically with the axis of the pan to swing toward and from the draft frame and connected with said lever to be operated thereby, latches mounted on said bail at opposite sides of the scraper, means carried by the draft frame adapted to hold said latches in operative position and to release the same by movement of the bail away from the draft frame to a predetermined extent, and means carried by said arcuate members and cooperating with said latches to hold the pan against rotation.

13. An earth scraper of the type described comprising a draft frame, a pan pivotally connected therewith and having arcuate rolling members secured thereto to rotate therewith, a control lever, latch mechanism for holding the pan against rotation, and supporting means for said latch mechanism pivotally mounted on a pivot axis spaced from the pivot of said lever, said latch mechanism being operative by actuation of said lever to control the movement of the pan between loading and transport positions, the actuation of said lever also tripping the pan to permit it to dump.

14. An earth scraper of the type described comprising a draft frame, a pan pivotally connected therewith and having means forming arcuate rolling surfaces at the ends thereof to rotate therewith, a control lever pivotally supported on said frame, latch mechanism for holding the pan against rotation, and vertically swinging means pivotally mounted on a pivot axis disposed rearwardly from the axis of said lever, said vertically swinging means supporting said latch mechanism and adapted to be moved by said lever to move said latch mechanism into position to hold the pan in its transport and loading positions, and to release the pan to permit it to rotate.

15. An earth scraper of the type described comprising a draft frame, a pan pivotally connected therewith and having means forming arcuate rolling surfaces secured thereto to rotate therewith, a lever fulcrumed on the draft frame, a vertically swinging support pivotally mounted on a pivot axis disposed rearwardly from the axis of said lever and operatively connected with said lever to be movable relatively to the draft frame by the operation of said lever, and latch mechanism mounted on said support and movable therewith into or out of position by the actuation of said lever to hold the pan against rotation.

JOSEPH H. SLAKER.